(12) United States Patent
Nakamura et al.

(10) Patent No.: US 12,552,135 B2
(45) Date of Patent: Feb. 17, 2026

(54) ALUMINUM ALLOY CLAD MATERIAL FOR HEAT EXCHANGER

(71) Applicant: UACJ Corporation, Tokyo (JP)

(72) Inventors: Shinichi Nakamura, Tokyo (JP); Tomohiro Shoji, Tokyo (JP); Ryo Tomori, Tokyo (JP)

(73) Assignee: UACJ CORPORATION, Tokyo (JP)

( * ) Notice: Subject to any disclaimer, the term of this patent is extended or adjusted under 35 U.S.C. 154(b) by 0 days.

(21) Appl. No.: 18/700,106

(22) PCT Filed: Sep. 26, 2022

(86) PCT No.: PCT/JP2022/035720
§ 371 (c)(1),
(2) Date: Apr. 10, 2024

(87) PCT Pub. No.: WO2023/063065
PCT Pub. Date: Apr. 20, 2023

(65) Prior Publication Data
US 2024/0399710 A1  Dec. 5, 2024

(30) Foreign Application Priority Data

Oct. 11, 2021 (JP) .................. 2021-166787

(51) Int. Cl.
*B32B 15/01* (2006.01)
*B23K 35/02* (2006.01)
(Continued)

(52) U.S. Cl.
CPC ........ *B32B 15/016* (2013.01); *B23K 35/0238* (2013.01); *B23K 35/22* (2013.01);
(Continued)

(58) Field of Classification Search
None
See application file for complete search history.

(56) References Cited

U.S. PATENT DOCUMENTS

| 6,921,584 B2 * | 7/2005 | Syslak .................. C22C 21/02 |
| | | 165/905 |
| 2021/0187673 A1 | 6/2021 | Kondo et al. |
| 2021/0346992 A1 | 11/2021 | Maruno et al. |

FOREIGN PATENT DOCUMENTS

| JP | 1-255638 A | 10/1989 |
| JP | 2007-297673 A | 11/2007 |

(Continued)

OTHER PUBLICATIONS

International Search Report dated Dec. 13, 2022, issued in counterpart International Application No. PCT/JP2022/035720, with English Translation. (5 pages).

(Continued)

Primary Examiner — Daniel J. Schleis
(74) Attorney, Agent, or Firm — WHDA, LLP

(57) ABSTRACT

An aluminum alloy clad material for a heat exchanger comprises a cladding material on one side surface or both side surfaces of a core material, wherein the core material comprises: Mn at 0.50 to 1.80 mass %; and one or more types selected from Cu at more than 0.05 mass % and less than 0.20 mass % and Ti at 0.05 to 0.30 mass % with the balance being Al and inevitable impurities, and the cladding material comprises: Si at 3.00 to 10.00 mass %; Fe at 0.30 to 0.80 mass %; Mn at 0.30 to 1.80 mass %; and Zn at 1.00 to 5.00 mass % with the balance being Al and inevitable impurities, in which the total content of the Fe and the Mn is 2.10 mass % or less.

8 Claims, 3 Drawing Sheets

(51) Int. Cl.
  *B23K 35/22* (2006.01)
  *B23K 35/28* (2006.01)
  *C22C 21/00* (2006.01)
  *C22C 21/02* (2006.01)
  *C22C 21/10* (2006.01)

(52) U.S. Cl.
  CPC ............ *B23K 35/28* (2013.01); *B23K 35/286* (2013.01); *C22C 21/00* (2013.01); *C22C 21/02* (2013.01); *C22C 21/10* (2013.01)

(56) References Cited

FOREIGN PATENT DOCUMENTS

| | | |
|---|---|---|
| JP | 2013-189659 A | 9/2013 |
| JP | 2014-28389 A | 2/2014 |
| JP | 2014-194051 A | 10/2014 |
| JP | 2016-98404 A | 5/2016 |
| JP | 2016-98405 A | 5/2016 |
| JP | 2017-145463 A | 8/2017 |
| JP | 2020-41189 A | 3/2020 |
| JP | 2021-080543 A | 5/2021 |

OTHER PUBLICATIONS

Written Opinion of the International Searching Authority (Form PCT/ISA/237) dated Dec. 13, 2022, issued in counterpart International Application No. PCT/JP2022/035720. (3 pages).
Office Action dated Sep. 4, 2025, issued in counterpart JP Application No. 2021-166787, with English translation.(8 pages).

* cited by examiner

[Fig.1]
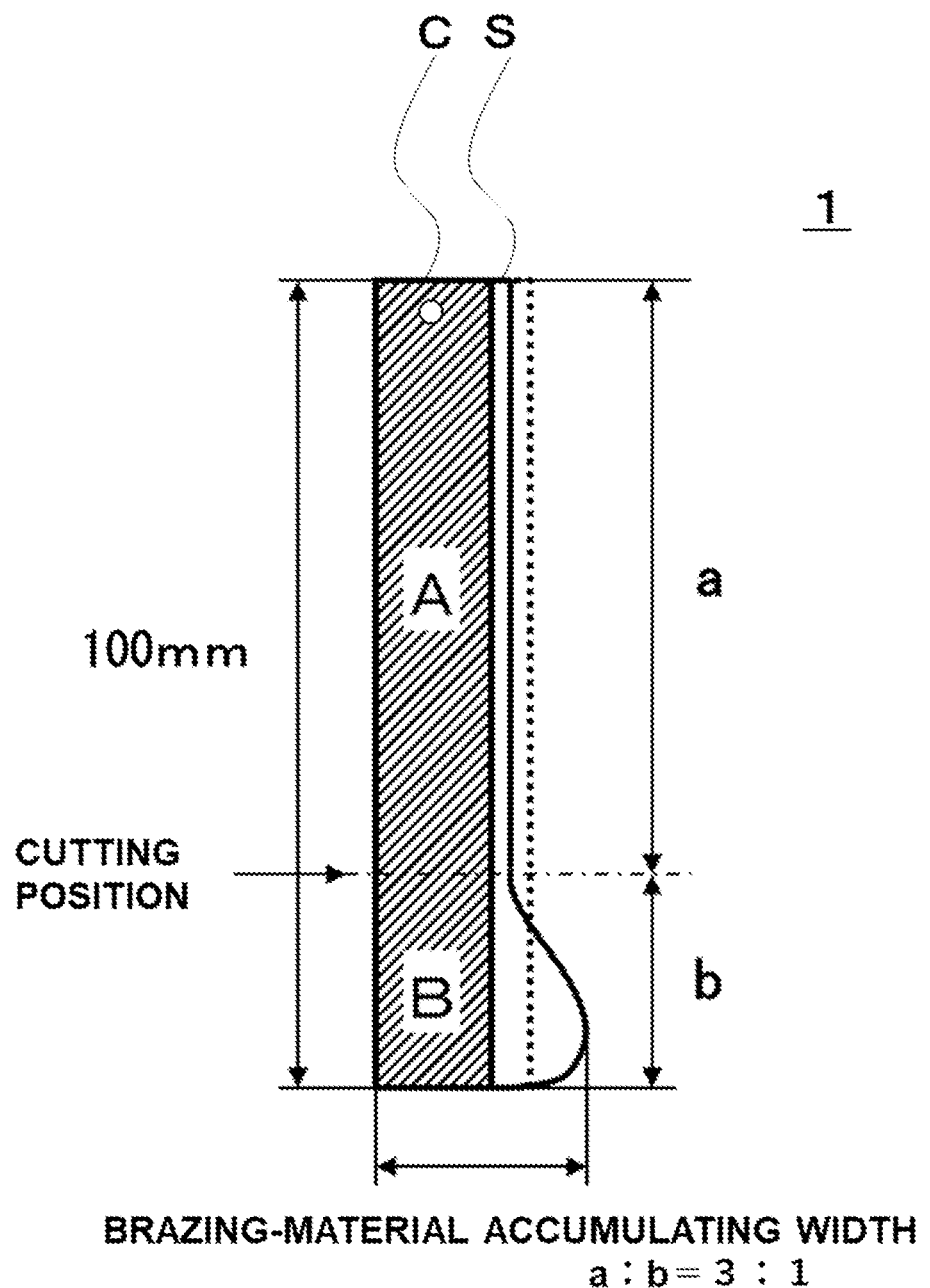

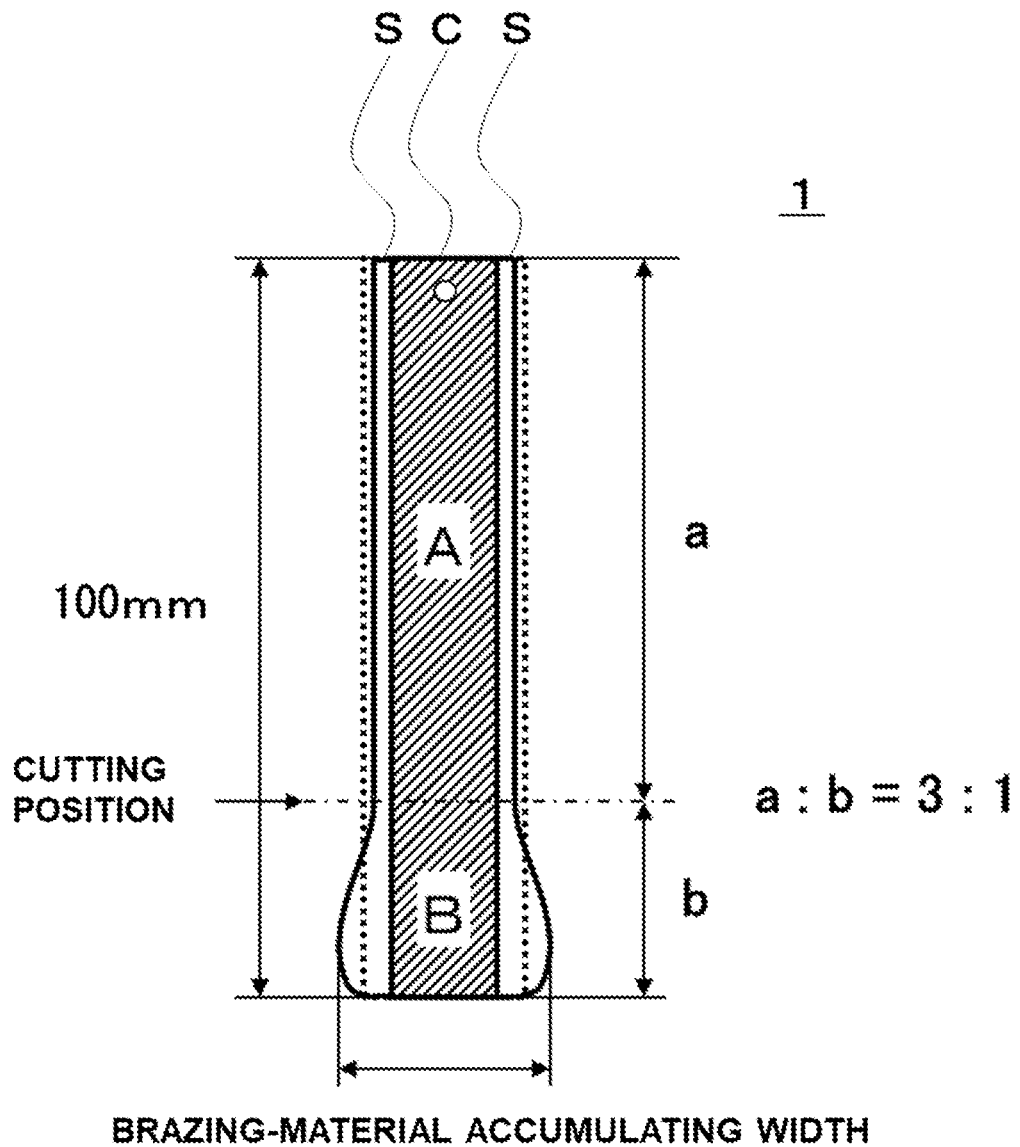
[Fig.2]
BRAZING-MATERIAL ACCUMULATING WIDTH

【Fig.3】
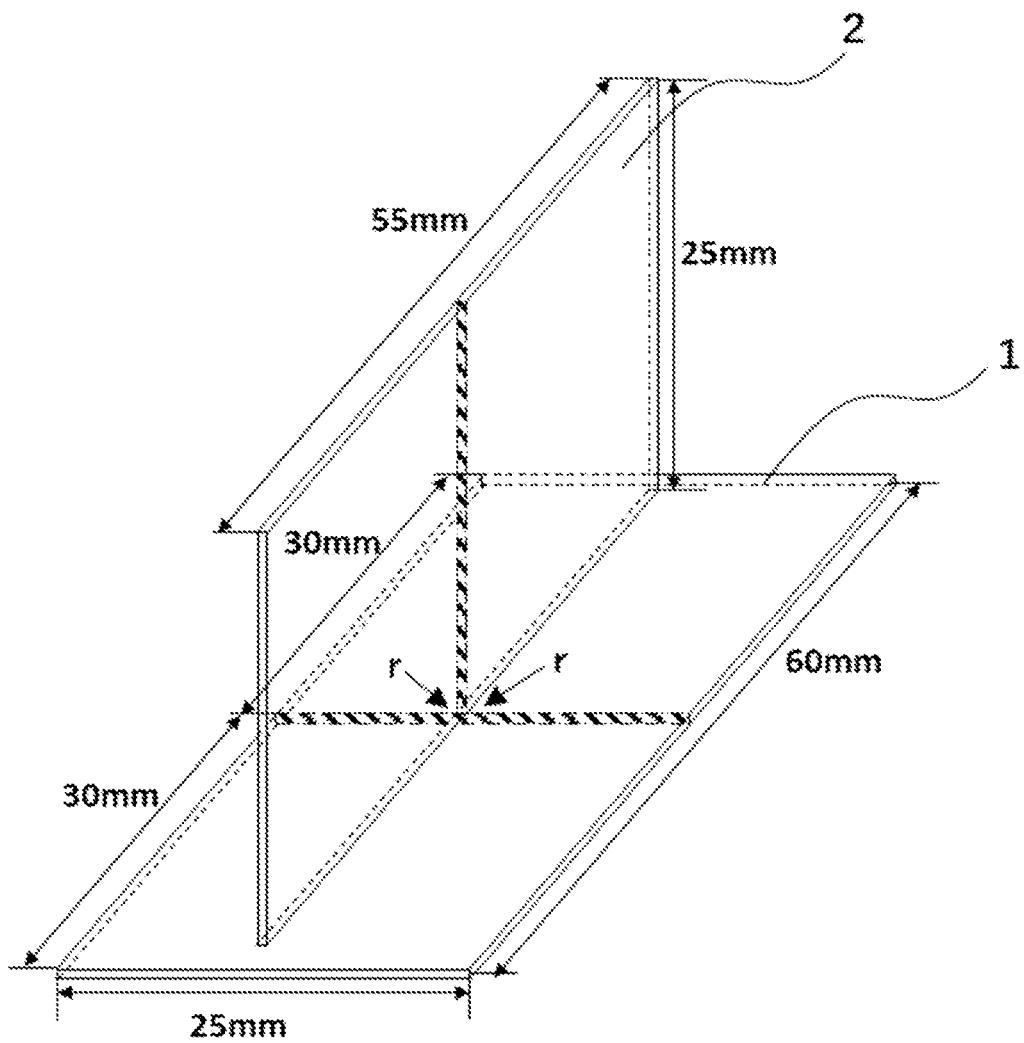

ALUMINUM ALLOY CLAD MATERIAL FOR HEAT EXCHANGER

TECHNICAL FIELD

The present invention relates to an aluminum alloy clad material for a heat exchanger having excellent brazability and outer-surface corrosion resistance suitable for use as a tube material, a tank, and a header material of an aluminum-alloy heat exchanger produced by brazing.

BACKGROUND ART

Aluminum alloys, which have light weight and excellent thermal conductivity, are generally used for automotive heat exchangers such as radiators, heaters, evaporators, and condensers. These heat exchangers are manufactured by a method of, for example, forming refrigerant passage tubes including flow channels formed by bending sheet materials or many flow channels formed by stacking sheet materials formed by press working or the like, combining members such as fin materials, and brazing them together using fluoride flux in an inert gas atmosphere (see Patent Literatures 1 to 6, for example).

CITATION LIST

Patent Literature

Patent Literature 1: Japanese Patent Publication 2014-194051-A
Patent Literature 2: Japanese Patent Publication 2014-28389-A
Patent Literature 3: Japanese Patent Publication 2007-297673-A
Patent Literature 4: Japanese Patent Publication 2016-098405-A
Patent Literature 5: Japanese Patent Publication 2016-98404-A
Patent Literature 6: Japanese Patent Publication 2020-041189-A

SUMMARY OF INVENTION

Technical Problem

In recent years, as automobiles have become lighter, materials for heat exchangers have also been required to be thinner. In these thinner materials for heat exchangers, there is a growing demand for not only higher strength of sheet materials for refrigerant passage tubes or formability of the thinner materials, but also compatibility between brazability and corrosion resistance.

With regard to corrosion resistance, for example, outer surfaces of evaporators are exposed to a corrosive environment due to condensation water produced by condensation during use, and outer surfaces of condensers are similarly exposed to a corrosive environment due to road splash containing snow-melting salt during traveling. For example, if a refrigerant passage tube is perforated early due to corrosion, the refrigerant leaks and the heat exchanger does not function adequately. Thus, anti-corrosion treatment is commonly applied to the outer surface of the refrigerant passage tube to extend the life of the heat exchanger.

As one of the methods for preventing corrosion on outer surfaces of refrigerant passage tubes, a method of forming a refrigerant passage tube by forming, in a tubular shape, a sheet material clad with an Al—Zn-based alloy as a sacrificial anode material on its outer surface or by forming such sheet materials by press working and stacking them is used.

However, most heat exchangers have a structure in which fins are joined to the outer surfaces of the refrigerant passage tubes, and thus this method has to use a fin material clad with brazing material if no brazing material is present on the outer surface of the refrigerant passage tube. In this case, there is a problem in that the self-corrosion resistance of the fin material decreases due to the brazing material remaining on the surface of the fin, or the production cost of the heat exchanger increases because the production cost when using the clad fin material is higher than that when using a bare fin.

On the other hand, when a fin to be joined to the outer surface of the refrigerant passage tube is formed of a bare material, the self-corrosion resistance of the fin can be improved and the performance of the heat exchanger can be improved by using a high-conductivity material, and the cost can also be kept lower than that with the clad fin material.

In this case, however, a brazing material needs to be added to the outer surface of the refrigerant passage tube, and thus a powdered brazing material is to be applied to the surface of the above-mentioned Al—Zn-based alloy, or a sheet material clad on its outer surface with an Al—Si-based alloy brazing material to which Zn is added is to be used. In the former case, the manufacturing cost of the heat exchanger will increase because the cost of the powdered brazing material is high. In the latter case, the molten brazing material comprising Zn flows during brazing, and thus there are problems in that a required amount of Zn as a sacrificial anode material does not remain on the outer surface of the refrigerant passage tube after brazing, resulting in insufficient anti-corrosion effect for the refrigerant passage tube, and that the molten brazing material comprising Zn flows to a joint, thereby causing preferential corrosion of the joint, for example.

In order to solve these problems, a method of obtaining a sacrificial anode effect can be considered, in which an Al—Zn-based sacrificial anode material to be clad on the outer surface of the refrigerant passage tube comprises Si at a concentration lower than the Si concentration of a general Al—Si-based alloy brazing material, a bare fin material is joined by partially melting the sacrificial anode material, and the amount of molten liquid phase is reduced to a content lower than that in a conventional Al—Si-based alloy brazing material, whereby the flow of Zn in the sacrificial anode material during brazing is suppressed such that a sufficient amount of Zn remains on the outer surface of the refrigerant passage tube after brazing.

However, in this method, there are problems as follows. The amount of Si added is not appropriate, and thus a sufficient amount of liquid phase to join the bare fin material is not obtained. Added elements other than Si are not suitable, and the self-corrosion resistance accordingly decreases. Even if the added amount of Si is appropriate and the added elements are suitable, the solidification structure after brazing caused by melting has two phases of primary and eutectic crystals, and the potential of the eutectic crystals is less-noble than that of the primary crystals, which causes preferential corrosion of a eutectic-crystal portion, and a primary-crystal portion that should serve as a sacrificial anode material falls off early, resulting in reduced corrosion resistance.

In order to solve this problem, a method of relatively suppressing the preferential corrosion of the eutectic crystal parts can be considered, in which, for the purpose of coarsening the primary crystals, suppressing falling off of the primary crystals even when preferential corrosion of the eutectic crystals occurs, and forming an area the potential of which is less-noble in the primary crystals, Mn is added to the outer-surface clad material to coarsen the primary crystals and suppress the falling off of the primary crystals, and also an Al—Mn—Si-based compound is formed in the primary crystals, thereby allowing a Mn/Si-deficient layer formed around the Al—Mn—Si-based compound to become the area the potential of which is less-noble.

However, a problem arises in that the deficient layer of the Al—Mn—Si-based compound alone is not effective enough to suppress the preferential corrosion.

It is an object of the present invention to provide an aluminum alloy clad material for a heat exchanger that can exhibit excellent brazability and outer-surface corrosion resistance even when used as a tube material, a tank material, a header material, or the like of an aluminum-alloy heat exchanger, even if the thickness thereof is thin.

Solution to Problem

As a result of repeated studies in order to solve the above-mentioned technical problems, the inventors of the present invention found that the technical problems can be solved by an aluminum alloy clad material for a heat exchanger comprising a cladding material on one side surface or both side surfaces of a core material, wherein the core material comprises: Mn at 0.50 to 1.80 mass %; and one or more types selected from Cu at more than 0.05 mass % and less than 0.20 mass % and Ti at 0.05 to 0.30 mass % with the balance being Al and inevitable impurities, and the cladding material comprises: Si at 3.00 to 10.00 mass %; Fe at 0.30 to 0.80 mass %; Mn at 0.30 to 1.80 mass %; and Zn at 1.00 to 5.00 mass % with the balance being Al and inevitable impurities, in which the total content of the Fe and the Mn is 2.10 mass % or less. Thus, the inventors have completed the present invention based on this knowledge.

More specifically, the present invention provides:

(1) an aluminum alloy clad material for a heat exchanger comprising a cladding material on one side surface or both side surfaces of a core material, wherein
the core material comprises: Mn at 0.50 to 1.80 mass %; and one or more types selected from Cu at more than 0.05 mass % and less than 0.20 mass % and Ti at 0.05 to 0.30 mass % with the balance being Al and inevitable impurities, and
the cladding material comprises: Si at 3.00 to 10.00 mass %; Fe at 0.30 to 0.80 mass %; Mn at 0.30 to 1.80 mass %; and Zn at 1.00 to 5.00 mass % with the balance being Al and inevitable impurities, in which the total content of the Fe and the Mn is 2.10 mass % or less;

(2) the aluminum alloy clad material for a heat exchanger according to (1) above, wherein a cladding-material residual ratio is 50 to 98 wt % in a heating test in which the temperature is raised at an average temperature-rising rate of 50° C./min from room temperature to 600° C. and kept at 600° C. for 3 minutes;

(3) the aluminum alloy clad material for a heat exchanger according to (1) or (2) above, wherein the core material further comprises one or more types selected from Cr at 0.300 mass % or less and Zr at 0.300 mass % or less;

(4) the aluminum alloy clad material for a heat exchanger according to any one of (1) to (3) above, wherein the core material further comprises Mg at 0.500 mass % or less;

(5) the aluminum alloy clad material for a heat exchanger according to any one of (1) to (4) above, wherein the core material further comprises one or more types selected from Si at 0.8 mass % or less and Fe at 0.7 mass % or less;

(6) the aluminum alloy clad material for a heat exchanger according to any one of (1) to (5) above, wherein the cladding material further comprises Mg at 0.500 mass % or less;

(7) the aluminum alloy clad material for a heat exchanger according to any one of (1) to (6) above, wherein the cladding material further comprises Sr at 0.050 mass % or less;

(8) the aluminum alloy clad material for a heat exchanger according to any one of (1) to (7) above, wherein the cladding material further comprises one or more types selected from Cr at 0.30 mass % or less and Zr at 0.30 mass % or less; and (9) the aluminum alloy clad material for a heat exchanger according to any one of (1) to (8) above, wherein the cladding material further comprises one or more types selected from In at 0.100 mass % or less and Sn at 0.100 mass % or less.

Advantageous Effect of Invention

In the aluminum alloy clad material for a heat exchanger according to the present invention, the cladding material forms a small amount of liquid phase in the cladding material during heating for brazing, thereby serving as a brazing material, and also a considerable amount of its components remains after heating for brazing, thereby serving as a sacrificial anti-corrosion material after the heating for brazing.

In other words, in the aluminum alloy clad material for a heat exchanger according to the present invention, the cladding material serves as a clad layer that has a sacrificial anti-corrosion function and can be joined by heating with a single layer.

Thus, according to the present invention, it is possible to provide the aluminum alloy clad material for a heat exchanger that can exhibit excellent brazability and outer-surface corrosion resistance even if the thickness is thin.

BRIEF DESCRIPTION OF DRAWINGS

FIG. 1 is a schematic diagram illustrating a state of an aluminum alloy clad material for a heat exchanger comprising a cladding material on one side surface of a core material after heating in a drop-type fluidity test.

FIG. 2 is a schematic diagram illustrating a state of an aluminum alloy clad material for a heat exchanger comprising cladding materials on both side surfaces of the core material after heating in the drop-type fluidity test.

FIG. 3 is a schematic diagram for describing a test procedure of an inverted-T test.

DESCRIPTION OF EMBODIMENTS

An aluminum alloy clad material for a heat exchanger according to the present invention is
an aluminum alloy clad material for a heat exchanger comprising a cladding material on one side surface or both side surfaces of a core material, wherein
the core material comprises: Mn at 0.50 to 1.80 mass %; and one or more types selected from Cu at more than 0.05 mass % and less than 0.20 mass % and Ti at 0.05 to 0.30 mass % with the balance being Al and inevitable impurities, and the cladding material comprises: Si at 3.00 to 10.00 mass %; Fe at 0.30 to 0.80 mass %; Mn at 0.30 to 1.80 mass %; and Zn at 1.00 to 5.00 mass % with the balance being Al and inevitable impurities, in which the total content of the Fe and the Mn is 2.10 mass % or less.

The following describes the core material and the cladding material that constitute the aluminum alloy clad material for a heat exchanger according to the present invention. Herein, the amounts of the respective components that constitute the core material and the cladding material mean values measured by inductively coupled plasma (ICP) emission spectrochemical analysis according to JIS H 1305.

In the aluminum alloy clad material for a heat exchanger according to the present invention, the core material comprises Mn at 0.50 to 1.80 mass % and one or more types selected from Cu at more than 0.05 mass % and less than 0.20 mass % and Ti at 0.05 to 0.30 mass % with the balance being Al and inevitable impurities.

In the aluminum alloy clad material for a heat exchanger according to the present invention, Mn comprised in the core material is a component that increases the strength of the core material.

The Mn content in the core material is 0.50 to 1.80 mass, preferably 0.80 to 1.80 mass %, and more preferably 1.00 to 1.70 mass %.

When the Mn content in the core material is within these ranges, the strength of the core material can be sufficiently increased and excellent rolling workability can be easily provided.

In the aluminum alloy clad material for a heat exchanger according to the present invention, the core material comprises one or more types selected from Cu and Ti.

Cu is a component that sets the potential of the core material noble to improve corrosion resistance.

The Cu content in the core material is more than 0.05 mass % and less than 0.20 mass %, preferably from 0.05 to 0.18 mass %, and more preferably 0.05 to 0.15 mass %. When the Cu content in the core material is within these ranges, the corrosion resistance of the core material can be sufficiently improved, and the diffusion of Cu toward the cladding material during brazing can be suppressed to prevent the potential of the cladding material from becoming noble (the sacrificial anode effect from decreasing).

Ti is a component that sets the potential of the core material noble to improve corrosion resistance, and also allows the corrosion of the core material to develop in a layered manner and suppresses development of corrosion in the depth direction.

The Ti content in the core material is 0.05 to less than 0.30 mass %, preferably 0.05 to 0.25 mass %, and more preferably 0.05 to 0.20 mass %.

When the Ti content in the core material is within these ranges, the corrosion resistance of the core material can be sufficiently improved, and also the formation of a coarse crystallized substance during casting can be suppressed, which allows the material to be easily formed into a sheet material.

In the aluminum alloy clad material for a heat exchanger according to the present invention, the core material may comprise one or more types selected from Cr and Zr.

Cr and Zr are components that function to coarsen grains of the core material and, by coarsening the grains, can suppress the occurrence of erosion caused by the penetration of a molten brazing material into grain boundaries during brazing.

The Cr content in the core material is preferably 0.3000 mass % or less, more preferably 0.0005 to 0.2800 mass %, and even more preferably 0.0005 to 0.2500 mass %.

The Zr content in the core material is preferably 0.3000 mass % or less, more preferably 0.0001 to 0.2800 mass %, and even more preferably 0.0005 to 0.2500 mass %.

When the content of Cr or Zr in the core material is 0.3000 mass % or less, the formation of coarse crystallized substances during casting can be suppressed, which allows the material to be easily formed into a sheet material.

In the aluminum alloy clad material for a heat exchanger according to the present invention, the core material may comprise Mg.

Mg is a component that increases the strength of the core material.

The Mg content in the core material is preferably 0.500 mass % or less, more preferably 0.001 to 0.480 mass %, and even more preferably 0.001 to 0.450 mass %.

When the Mg content in the core material is 0.500 mass % or less, the decrease in formability associated with the increase in strength due to fine precipitation by Mg can be suppressed.

In the aluminum alloy clad material for a heat exchanger according to the present invention, the core material may comprise Fe.

Fe is a component that increases the strength of the core material, but also a component that decreases the corrosion resistance. Thus, the Fe content in the core material is preferably 1.00 mass % or less and, in order to improve the corrosion resistance of the core material, is more preferably 0.01 to 0.10 mass %.

In the aluminum alloy clad material for a heat exchanger according to the present invention, the core material may comprise one or more types selected from V, Mo, and Ni.

The content of each of V, Mo, and Ni in the core material is preferably 0.300 mass % or less, and more preferably 0.001 to 0.100 mass %.

In the aluminum alloy clad material for a heat exchanger according to the present invention, the core material may comprise one or more types selected from Pb, Li, Ca, and Na.

The content of each of Pb, Li, Ca, and Na in the core material is preferably 0.1000 mass % or less, and more preferably 0.0001 to 0.0500 mass %.

In the aluminum alloy clad material for a heat exchanger according to the present invention, the core material may comprise B.

B is a component that improves the antioxidant effect of the core material. The content of B in the core material is preferably 0.100 mass % or less, and more preferably 0.001 to 0.050 mass %.

In the aluminum alloy clad material for a heat exchanger according to the present invention, the core material may comprise inevitable impurities other than the above-described components and Al.

In the present application document, the contents of the respective components constituting the core material and the cladding material described later mean values measured by an emission spectrophotometer.

In the aluminum alloy clad material for a heat exchanger according to the present invention, the cladding material comprises Si at 3.00 to 10.00 mass %, Fe at 0.30 to 0.80 mass %, Mn at 0.30 to 1.80 mass %, and Zn at 1.00 to 5.00 mass % with the balance being Al and inevitable impurities, in which the total content of the Fe and the Mn is 2.00 mass % or less.

In the aluminum alloy clad material for a heat exchanger according to the present invention, the cladding material forms a small amount of liquid phase in the cladding material during heating for brazing, thereby serving as a brazing material, and also a considerable amount of its components remains after heating for brazing, thereby serving as a sacrificial anti-corrosion material after the heating for brazing.

In other words, in the aluminum alloy clad material for a heat exchanger according to the present invention, the cladding material serves as a clad layer that has a sacrificial anti-corrosion function and can be joined by heating with a single layer.

Si that is a constituent component of the cladding material is a component that lowers the melting point of Al to increase fluidity, and produces a small amount of liquid phase in the cladding material, thereby exerting the function of a brazing material. Thus, it is a component that enables an opposed material such as a bare fin material or an aluminum sheet material to be joined to the cladding material surface by brazing.

The Si content in the cladding material is 3.00 to 10.00 mass %, preferably 3.50 to 8.50 mass %, and more preferably 3.50 to 7.00 mass %.

When the Si content in the cladding material is within these ranges, a small amount of adequate liquid phase can be generated in the cladding material to form a sound fillet at the joint with the opposed material, and also excessive melting of the cladding material is prevented, whereby flowing of Zn in the cladding material, which causes a sacrificial anode effect during brazing, can be suppressed.

Fe that is a constituent component of the cladding material is a component that has conventionally been considered less effective in improving corrosion resistance than Zn does, for example, and the content thereof has been preferably restricted. In contrast, according to studies of the inventors, it was found that Fe easily forms intermetallic compounds such as Al—Fe-based, Al—Fe—Si-based, and Al—Fe—Mn—Si-based compounds, Fe-, Si-, and Mn-deficient layers formed around these intermetallic compounds become areas the potential of which is less-noble, which can suppress preferential corrosion of the eutectic area and improve corrosion resistance.

The Fe content in the cladding material is 0.30 to 0.80 mass %, preferably 0.30 to 0.70 mass %, and more preferably 0.30 to 0.60 mass %.

When the Fe content in the cladding material is within these ranges, sufficient corrosion resistance can be achieved and the decrease in corrosion resistance caused by a Fe compound serving as a starting point of a cathode can be suppressed.

Mn that is a constituent component of the cladding material is a component that improves the corrosion resistance of the cladding material.

In the aluminum alloy clad material for a heat exchanger according to the present invention, the cladding material comprises Si, which partially melts during brazing and forms a solidified structure after brazing. Thus, the cladding material has two phases of primary and eutectic crystals, and this eutectic-crystal portion corrodes more preferentially than a primary-crystal portion because the potential thereof is less-noble than that of the primary-crystal portion. If the eutectic-crystal portion corrodes, the primary-crystal portion is isolated and accordingly falls off in a granular form. If the primary-crystal portion having a sacrificial anode effect falls off, the sacrificial anode material disappears without exerting the effect, so that the core material corrodes early to be perforated.

In order to prevent this, it is necessary to coarsen the primary crystals such that the primary crystals do not easily fall off even when preferential corrosion of the eutectic crystals occurs, and also to form an area the potential of which is less-noble also in the primary crystals. In the aluminum alloy clad material for a heat exchanger according to the present invention, the cladding material comprises Mn, whereby the primary crystals are coarsened and the falling off of the primary crystals can be prevented, and also an Al—Mn—Si-based compound is formed in the primary crystals and a Mn/Si-deficient layer formed around the Al—Mn—Si-based compound becomes an area the potential of which is less-noble, which functions to suppress preferential corrosion of the eutectic-crystal portion relatively.

The Mn content in the cladding material is 0.30 to 1.80 mass %, preferably 0.30 to 1.50 mass %, and more preferably 0.30 to 1.30 mass %.

When the Fe content in the cladding material is within these ranges, it is possible to suppress the decrease in the Si concentration in the outer-surface clad material due to the formation of an Al—Mn—Si-based compound to suppress the decrease in the amount of liquid phase during brazing, while sufficiently improving the corrosion resistance of the cladding material.

In the aluminum alloy clad material for a heat exchanger according to the present invention, the total content of Fe and Mn constituting the cladding material is 2.10 mass % or less, preferably 0.60 to 2.00 mass %, and more preferably 0.60 to 1.90 mass %.

When the total content of Fe and Mn constituting the cladding material is 2.10 mass % or less, it is possible to easily exert desired corrosion resistance by suppressing preferential corrosion of the joint after brazing and preventing the falling off of the primary crystals, while easily exerting brazability.

Zn that is a constituent component of the cladding material is a component that sets the natural potential of the cladding material less-noble and allows the cladding material to serve as a sacrificial anode material for a long period of time.

In the aluminum alloy clad material for a heat exchanger according to the present invention, the cladding material comprises Zn, which functions to diffuse Zn into the core material during brazing to form a Zn concentration gradient in the thickness direction of the core material. This sets the potential of the cladding material less-noble than that of the core material and allows the cladding material to serve as a sacrificial anode material, and thus development of corrosion in the thickness direction can be suppressed.

The Zn content in the cladding material is 1.00 to 5.00 mass %, preferably 1.50 to 4.50 mass %, and more preferably 2.00 to 4.00 mass %.

When the Zn content in the cladding material is within these ranges, the effect of setting the potential less-noble by Zn can be fully exerted, and also early corrosion of a fillet formed at a joint with the opposed material after brazing can be effectively prevented.

In the aluminum alloy clad material for a heat exchanger according to the present invention, the cladding material may comprise Mg.

The Mg content in the cladding material is preferably 0.500 mass % or less, more preferably 0.001 to 0.400 mass %, and even more preferably 0.001 to 0.300 mass %.

When the Mg content in the cladding material is 0.500 mass % or less, the formation of $MgF_2$ by reaction with Mg when flux is applied to the cladding material surface can be suppressed, and an oxide film can be easily broken by the flux during brazing.

In the aluminum alloy clad material for a heat exchanger according to the present invention, the cladding material may comprise Sr.

Sr is a component that functions to finely disperse Si particles in the cladding material such that the liquid phase of a molten brazing material formed during brazing is easily joined to each other, thereby increasing the fluidity of the liquid phase and improving brazability.

The Sr content in the cladding material is preferably 0.050 mass % or less, more preferably 0.005 to 0.045 mass %, and even more preferably 0.005 to 0.040 mass %.

When the Sr content in the cladding material is within these ranges, the effect of improving the fluidity of the liquid phase of the molten brazing material during brazing and the brazability can be easily exerted, and the reduction of this effect due to formation of an Al—Si—Sr-based compound can be easily suppressed.

In the aluminum alloy clad material for a heat exchanger according to the present invention, the cladding material may comprise one or more types selected from Cr and Zr.

Cr and Zr are components that function to coarsen primary crystals in the solidified structure of the cladding material after brazing, and coarsen the primary crystals thereby exerting the effect of preventing the primary crystals from falling off.

The content of each of Cr and Zr in the cladding material is preferably 0.300 mass % or less, more preferably 0.001 to 0.280 mass %, and even more preferably 0.001 to 0.250 mass %.

When the content of each of Cr and Zr in the cladding material is 0.300 mass % or less, the formation of coarse crystallized substances during casting is suppressed, and suitable brazability can be easily achieved.

In the aluminum alloy clad material for a heat exchanger according to the present invention, the cladding material may comprise one or more types selected from In and Sn.

In and Sn have an effect of setting the potential less-noble even when the amounts thereof are small, and thus the presence of one or more types selected from In and Sn in the cladding material sets the potential of the cladding material less-noble than that of the core material, whereby the sacrificial anode effect can be easily improved.

The content of each of In and Sn in the cladding material is preferably 0.100 mass % or less, more preferably 0.001 to 0.150 mass %, and even more preferably 0.001 to 0.100 mass %.

When the content of each of In and Sn in the cladding material is within these ranges, it is possible to easily improve the sacrificial anode effect while maintaining self-corrosion resistance and brazability.

In the aluminum alloy clad material for a heat exchanger according to the present invention, the cladding material may comprise B.

B is a component that exerts an antioxidant effect on the cladding material.

The content of B in the cladding material is preferably 0.100 mass % or less, more preferably 0.001 to 0.080 mass %, and even more preferably 0.001 to 0.005 mass %.

The antioxidant effect can be easily exerted when the content of B in the cladding material is 0.100 mass % or less.

The aluminum alloy clad material for a heat exchanger according to the present invention has a fluid coefficient K that is preferably 0.020 to 0.500, more preferably 0.020 to 0.200, and even more preferably 0.040 to 0.100.

In the present application document, the fluid coefficient K means a value measured by a drop-type fluidity test described below.

Specifically, the aluminum alloy clad material for a heat exchanger to be measured is cut into 25 mm wide×100 mm long in the rolling direction as the longitudinal direction, one hole (6φ) is formed for suspension, and then the weight (W0) is measured.

This cut piece is then suspended in a nitrogen gas furnace, the temperature therein is raised at an average temperature-rising rate of 50° C./min from room temperature to 600° C. to heat it to the maximum temperature of 600° C., and further it is held at 600° C. for 3 minutes. After the heating test, a brazing-material accumulating portion in a lower portion of the cut piece (a portion corresponding to the lower ¼ part of the cut piece in the longitudinal direction) is cut, and its weigh (WB) is measured.

FIG. 1 is a schematic diagram illustrating a state of an aluminum alloy clad material 1 for a heat exchanger comprising a cladding material S on one side surface of a core material C after heating in a drop-type fluidity test. FIG. 2 is a schematic diagram illustrating a state of an aluminum alloy clad material 1 for a heat exchanger comprising cladding materials S, S on both side surfaces of the core material C after heating in the drop-type fluidity test.

As illustrated in FIGS. 1 and 2, each cladding material S comprised in the aluminum alloy clad material 1 for a heat exchanger is melted by heating, and its thicknesses change from the thickness indicated by the dashed line to the solid line in the figures, and form a brazing-material accumulating portion in the lower ¼ part of the cut piece (the lower portion including a lower part B of the core material).

A term "4WB−W0" calculated from the weight WB of this brazing-material accumulating portion and the weight W0 of the cut piece before the heating test corresponds to a value four times the weight of the cladding material melted from the upper ¾ part of the cut piece (the upper portion including an upper part A of the core material) by the heating test.

A term "4×¾×W0×Clad ratio", that is, "3W0×Clad ratio" corresponds to a value four times the weight of the cladding material in the upper ¾ part of the cut piece (the upper portion including the upper part A of the core material) before the heating test.

Therefore, the fluid coefficient K corresponding to the melting ratio of the cladding material before and after the heating can be calculated by Formula (I):

$$K = (4WB - W0)/(3W0 \times \text{Clad ratio}) \qquad (I)$$

In the aluminum alloy clad material for a heat exchanger according to the present invention, a cladding-material residual ratio is preferably 50 to 98 wt %, more preferably 80 to 98 wt %, and even more preferably 90 to 96 wt % in a heating test in which the temperature is raised at an average temperature-rising rate of 50° C./min from room temperature to 600° C. and kept at 600° C. for 3 minutes.

In the aluminum alloy clad material for a heat exchanger according to the present invention, the cladding material serves as a sacrificial anti-corrosion material after brazing. However, if the cladding-material residual ratio in the heating test is less than the above ranges, the sacrificial anti-corrosion of the cladding material becomes insufficient, and the corrosion resistance of the aluminum alloy clad sheet decreases.

In the present application document, the cladding-material residual ratio (wt %) means a value calculated by the following Formula (II) based on the above-described fluid coefficient K.

$$\text{Cladding-material residual ratio (wt \%)} = (1 - K) \times 100 \quad \text{(II)}$$

In the aluminum alloy clad material for a heat exchanger according to the present invention, when the cladding-material residual ratio is within the above ranges, the cladding material maintains its shape to a certain degree even after heating for brazing and serves as a sacrificial anti-corrosion material after the heating for brazing.

In other words, in the aluminum alloy clad material for a heat exchanger according to the present invention, the cladding material forms a small amount of liquid phase in the cladding material during heating for brazing, thereby serving as a brazing material, and also a considerable amount of its components remains after heating for brazing, thereby serving as a sacrificial anti-corrosion material after the heating for brazing.

In other words, in the aluminum alloy clad material for a heat exchanger according to the present invention, the cladding material serves as a clad layer that has a sacrificial anti-corrosion function and can be joined by heating with a single layer.

Thus, according to the present invention, it is possible to provide the aluminum alloy clad material for a heat exchanger that can exhibit excellent brazability and outer-surface corrosion resistance even if the thickness is thin.

The aluminum alloy clad material for a heat exchanger according to the present invention comprises the core material and the cladding material clad on one side surface or both side surfaces of the core material.

The aluminum alloy clad material according to the present invention can take: (1) a form of a two-layer material in which the cladding material is clad on only one side surface of the core material (core material/cladding material); (2) a form of a three-layer material in which the cladding material is clad on both side surfaces of the core material (cladding material/core material/cladding material); (3) a form of a three-layer material in which the cladding material is clad on one side surface of the core material and a sacrificial anode material is clad on the other side surface of the core material (cladding material/core material/sacrificial anode material); or (4) a form of a four-layer material in which the cladding material and an intermediate layer for increasing material strength are clad on one side surface of the core material and a sacrificial anode material is clad on the other side surface (cladding material/intermediate layer/core material/sacrificial anode material).

In the aluminum alloy clad material for a heat exchanger according to the present invention, the clad ratio (the ratio of the thickness of the cladding material to the thickness of the aluminum alloy clad material) of the cladding material clad on one side surface or both side surfaces of the core material is preferably 3 to 30%, more preferably 5 to 25%, and even more preferably 7 to 20%.

When the aluminum alloy clad material for a heat exchanger according to the present invention takes (2) the form of a three-layer material in which the cladding material is clad on both side surfaces of the core material, the compositions and the clad ratios of the brazing materials formed on both side surfaces of the core material may be the same or different.

In the present application document, the clad ratio of the cladding material clad on one side surface or both side surfaces of the core material means a value calculated by the following formula based on the arithmetic mean value of the thickness of the aluminum alloy clad material and the thickness of the cladding material each measured at three locations by cross-sectional observation.

$$\begin{aligned}&(\text{Arithmetic mean value of the thickness}\\&\quad\text{of the cladding material/Arithmetic mean value of the}\\&\quad\text{thickness of the aluminum alloy clad material}) \times 100\end{aligned}$$

When the aluminum alloy clad material for a heat exchanger according to the present invention takes (3) the form of a three-layer material in which the cladding material is clad on one side surface of the core material and a sacrificial anode material is clad on the other side surface, the sacrificial anode material is preferably made of aluminum or made of an aluminum alloy comprising Zn at 8.00 mass % or less with the balance being aluminum and inevitable impurities.

When the aluminum alloy clad material for a heat exchanger according to the present invention takes (4) the form of a four-layer material in which the cladding material and an intermediate layer for increasing material strength are clad on one side surface of the core material and a sacrificial anode material is clad on the other side surface, the intermediate layer is preferably made of aluminum or made of an aluminum alloy comprising Mg and Mn with the balance being aluminum and inevitable impurities.

When the intermediate layer is made of an aluminum alloy comprising Mg and Mn with the balance being aluminum and inevitable impurities, the Mg content is preferably 1.00 mass % or less, more preferably 0.30 to 1.00 mass %, and even more preferably 0.50 to 1.00 mass %.

When the intermediate layer is made of the aluminum alloy comprising Mg and Mn with the balance being aluminum and inevitable impurities, the Mn content is preferably 1.80 mass % or less, more preferably 0.80 to 1.75 mass %, and even more preferably 1.00 to 1.70%.

The purity of aluminum forming the above-described sacrificial anode material is preferably, but not limited to, 99.0 mass % or more, and more preferably 99.5 mass % or more.

The aluminum alloy for the sacrificial anode material is preferably comprises Zn. The Zn comprised in the sacrificial anode material has an effect of setting the potential less-noble, and makes a potential difference between the sacrificial anode material and the core material to exert the sacrificial anti-corrosion effect. The Zn content in the sacrificial anode material is preferably 8.00 mass % or less, and more preferably 3.00 mass % or less.

In the aluminum alloy clad material according to the present invention, this sacrificial anode material may comprise Fe.

When the sacrificial anode material comprises Fe, the Fe content in the sacrificial anode material is preferably 1.00 mass % or less, more preferably 0.05 to 0.80 mass %, and even more preferably 0.10 to 0.70 mass %.

When the content of Fe in the sacrificial anode material is within these ranges, the strength can be easily increased, and also deformation resistance during hot rolling increases, whereby the difference in deformation resistance from the core material can be reduced.

In the aluminum alloy clad material for a heat exchanger according to the present invention, the sacrificial anode material may comprise Mn.

When the sacrificial anode material comprises Mn, the Mn content in the sacrificial anode material is preferably 1.80 mass % or less, more preferably 0.10 to 1.50 mass %, and even more preferably 0.20 to 1.20 mass %.

When the Mn content in the sacrificial anode material is within these ranges, the size of grains of the sacrificial anode material formed by recrystallization during brazing can be adjusted.

In the aluminum alloy clad material for a heat exchanger according to the present invention, the sacrificial anode material may comprise Mg.

When the sacrificial anode material comprises Mg, the Mg content in the sacrificial anode material is preferably 1.00 mass % or less, more preferably 0.05 to 1.00 mass %, and even more preferably 0.10 to 0.80 mass %.

When the Mg content in the sacrificial anode material is within these ranges, the strength of the sacrificial anode material can be easily increased.

In the present application document, the contents of the respective components constituting the sacrificial anode material means values measured by an emission spectrophotometer (XPS).

In the aluminum alloy clad material for a heat exchanger according to the present invention, the clad ratio of the sacrificial anode material (the ratio of the thickness of the sacrificial anode material to the thickness of the aluminum alloy clad material) is preferably 3 to 30%, more preferably 5 to 25%, and even more preferably 7 to 20%.

In the present application document, the clad ratio of the sacrificial anode material means a value calculated by the following formula based on the arithmetic mean value of the thickness of the aluminum alloy clad material and the thickness of the sacrificial anode material each measured at three locations by cross-sectional observation.

(Arithmetic mean value of the thickness of the sacrificial anode material/Arithmetic mean value of the thickness of the aluminum alloy clad material)×100

When the aluminum alloy clad material for a heat exchanger according to the present invention is used for a refrigerant passage tube, the thickness of the aluminum alloy clad material in a sheet form to be used as a forming material thereof is preferably about 0.15 to 0.50 mm.

The aluminum alloy clad material for a heat exchanger according to the present invention may be formed of the cladding material the surface of which is etched with acid.

By this etching, an aluminum oxide film and the like formed on the surface can be weakened or removed in advance.

Details of this etching will be described later.

The following describes a method for producing the aluminum alloy clad material for a heat exchanger according to the present invention.

The method for producing the aluminum alloy clad material for a heat exchanger according to the present invention is a method of producing an aluminum alloy clad material (hereinafter, referred to as "aluminum-alloy-clad-material production method A") by subjecting a core-material ingot and a laminate with a cladding-material ingot stacked on one side surface or both side surfaces of the core-material ingot to at least hot working, cold working, and one or more annealings selected from one or more intermediate annealings between passes of rolling in the cold working and final annealing after the last pass of the cold working.

In the aluminum-alloy-clad-material production method A, the core-material ingot, the cladding-material ingot, and, if necessary, a sacrificial-anode-material ingot are prepared first by melting and casting aluminum alloys having desired chemical compositions to be used for the core material, the cladding material, and, if necessary, the sacrificial anode material. The method of melting and casting them are not limited to a particular one, and a common method is used.

Subsequently, the core-material ingot, the cladding-material ingot, and, if necessary, the sacrificial-anode-material ingot are preferably homogenized, as appropriate. The temperature for this homogenization is preferably 400 to 600° C., and the time for the homogenization is preferably 2 to 20 hours.

Subsequently, the core-material ingot, the cladding-material ingot, and, if necessary, the sacrificial-anode-material ingot are formed in predetermined thicknesses by facing or hot rolling, and then predetermined ingots are stacked in a predetermined order to form a laminate.

The core-material ingot, the cladding-material ingot, and, if necessary, the sacrificial-anode-material ingot respectively have compositions corresponding to the compositions of the core material, the brazing material, and the sacrificial anode material that constitute the aluminum alloy clad material to be obtained.

In the aluminum-alloy-clad-material production method A, the above-described laminate is subjected to at least hot working, cold working, and one or more annealings selected from one or more intermediate annealings between passes of rolling in the cold working and final annealing after the last pass of the cold working.

In the hot working, the laminate formed by stacking the predetermined ingots in the predetermined order is preferably hot rolled at 400 to 500° C. In the hot rolling, for example, rolling is performed until a sheet thickness of 2 to 8 mm is reached.

In the cold working, a hot-rolled product obtained by performing the hot working is cold rolled. In the cold working, cold rolling is performed in a plurality of passes.

In the cold working, one or two or more intermediate annealings between passes of the cold rolling are preferably performed such that the heating temperature becomes between 200 and 500° C., and more preferably performed such that it becomes between 250 and 400° C.

In each intermediate annealing, the temperature is raised to the intermediate annealing temperature, and cooling may be started immediately after the intermediate annealing temperature is reached, or cooling may be started after the intermediate annealing temperature is reached and then the resulting product is held at the intermediate annealing temperature for a certain time. The holding time at the intermediate annealing temperature is 0 to 10 hours, and preferably 1 to 5 hours.

After the cold rolling, the resulting cold-rolled product is subjected to final annealing as appropriate.

The final annealing is preferably performed such that the heating temperature becomes between 300 to 500° C., and more preferably performed such that it becomes 350 to 450° C.

In the final annealing, the temperature is raised to the final annealing temperature, and cooling may be started immediately after the final annealing temperature is reached, or cooling may be started after the final annealing temperature is reached and then the resulting product is held at the final annealing temperature for a certain time. The holding time at the final annealing temperature is preferably 0 to 10 hours, and more preferably 1 to 5 hours.

Although the atmosphere during the intermediate annealing and the final annealing is not limited to a particular one, these annealings are preferably performed in an atmosphere having a lower oxygen concentration than that in the air. By heating in an atmosphere having a lower oxygen concentration than that in the air, the growth of an oxide film on the surface of the brazing material can be suppressed.

In the aluminum-alloy-clad-material production method A, the intermediate annealings or the final annealing is preferably performed with the cladding-material ingot being rolled to a thickness of 10 μm to 50 μm, and more preferably performed with it being rolled to a thickness of 20 μm to 50 μm.

By controlling the thickness of the cladding-material ingot during the intermediate annealings or the final annealing within these ranges, desired brazing properties can be easily achieved.

In the aluminum-alloy-clad-material production method A according to the present invention, the surface of the clad material may be etched using acid, if necessary.

By performing the etching, an aluminum oxide film and the like formed during heating during the hot rolling or during heatings between passes and after the final pass of the cold rolling can be weakened or removed.

The timing for performing the etching is not limited to a particular timing if it is until brazing is performed with the resulting aluminum alloy clad material after the hot rolling. For example, the etching may be applied to a clad sheet after the hot rolling, or the etching may be applied to a clad sheet in the middle of the cold rolling. The etching may also be applied after the intermediate annealings or the final annealing.

Furthermore, after the above-described final annealing is completed, the aluminum alloy clad material may be stored in a state of having an oxide film, and the etching may be applied just before brazing.

If this oxide film has been weakened or removed when brazing is performed, the brazability during brazing with the common aluminum alloy clad material for a heat exchanger according to the present invention can be improved.

As acids to be used for the etching, for example, aqueous solutions of sulfuric acid, hydrochloric acid, nitric acid, phosphoric acid, hydrofluoric acid, and the like can be used. These acids may be used alone or in combination with two or more types. From the viewpoint of removing the oxide film more efficiently, it is preferable to use as the acid a mixed aqueous solution comprising hydrofluoric acid and an acid other than hydrofluoric acid, and it is more preferable to use a mixed aqueous solution of hydrofluoric acid and sulfuric acid or a mixed aqueous solution of hydrofluoric acid and nitric acid.

The etching amount during the etching is preferably 0.05 to 2.00 $g/m^2$. By setting the etching amount to 0.05 $g/m^2$ or more, and more preferably 0.10 $g/m^2$ or more, the oxide film on the brazing sheet surface can be sufficiently removed and brazability can be further improved.

From the viewpoint of improving the brazability of aluminum alloy clad material, there is no upper limit of the etching amount. However, if the etching amount is excessively large, it may be difficult to obtain the effect of brazability improvement commensurate with the processing time. This problem can be easily avoided by setting the etching amount to 2.00 $g/m^2$ or less, and more preferably 0.50 $g/m^2$ or less.

In the aluminum-alloy-clad-material production method A, the aluminum alloy clad material for a heat exchanger according to the present invention can be obtained in this way.

The aluminum alloy clad material for a heat exchanger according to the present invention can be used as a material that forms a refrigerant passage tube (a flow-channel tube through which refrigerant in a heat exchanger flows) and the like of the heat exchanger. For example, the aluminum alloy clad material for a heat exchanger according to the present invention in a sheet form is processed in a tubular shape to be formed into a tubular member, and this tubular member is then used alone or in combination with a plurality of the tubular members and brazed with fin materials or between the tubular members, whereby a refrigerant passage tube comprising a single or a plurality of refrigerant passages can be formed.

The refrigerant passage tube comprising the refrigerant passages can exchange heat with air when the brazed outer surface thereof comes into contact with air. A corrugated bare fin may be placed in the refrigerant passages.

In the aluminum alloy clad material for a heat exchanger according to the present invention, the cladding material forms a small amount of liquid phase in the cladding material during heating for brazing, thereby serving as a brazing material, and also some of its components remain after heating for brazing, thereby serving as a sacrificial anti-corrosion material after the heating for brazing.

In other words, in the aluminum alloy clad material for a heat exchanger according to the present invention, the cladding material serves as a clad layer that has a sacrificial anti-corrosion function and can be joined by heating with a single layer.

Thus, according to the present invention, it is possible to provide the aluminum alloy clad material for a heat exchanger that can exhibit excellent brazability and outer-surface corrosion resistance even if the thickness is thin.

The clad material of the present invention is produced by forming a core-material aluminum alloy and a cladding-material aluminum alloy into ingots by continuous casting, homogenizing the resulting ingots according to a common procedure, further hot rolling the ingot of the cladding-material aluminum alloy and then cladding this hot-rolled ingot onto the ingot of the core-material aluminum alloy, and subjecting the resulting laminate to hot clad rolling, intermediate annealing if necessary, cold rolling, and then final annealing.

Hereinafter, Examples of the present invention will be described in comparison with Comparative Examples to demonstrate the effects thereof. Note that these Examples are provided merely for one embodiment of the present invention, and the present invention is not limited thereto.

EXAMPLES

Core-material ingots and cladding-material ingots having chemical compositions given in Table 1 were each prepared by continuous casting (the amounts of the respective components that constitute each core-material ingot or each cladding-material ingot given in Table 1 mean values measured by inductively coupled plasma (ICP) emission spectrochemical analysis according to the provisions of JIS H 1305, which specifically mean values measured by an inductively coupled plasma (ICP) emission spectrophotometer with samples to be analyzed that are prepared by feeding all raw materials of the core-material ingot or all raw materials of the cladding-material ingot into a casting furnace, melting and stirring them, and then pouring a small amount of molten metal from the resulting molten metal into a mold for analysis).

Subsequently, each core-material ingot was homogenized, and was then faced such that the thickness of the core-material ingot was a predetermined thickness. Each cladding-material ingot was homogenized, and was then hot rolled such that the thickness of the cladding-material ingot was a predetermined thickness.

In combinations of core-material ingots and cladding-material ingots having the chemical compositions given in Table 1 obtained in a manner described above, they were stacked in the form of cladding-material ingot/core-material ingot, whereby two-layered laminates were obtained in each of which the cladding-material ingot was stacked on one side surface of the core-material ingot.

In each laminate, the thickness of the cladding-material ingot corresponds to 10% of the thickness of the laminate having two layers.

Aluminum alloy clad materials (O-materials) 1 to 7 having a two-layer structure with a thickness of 0.4 mm were produced by hot rolling the obtained laminates at 480° C. to join each core-material ingot and cladding-material ingot, and then subjecting the resulting laminates to cold rolling and final annealing at 400° C. for 3 hours.

The obtained aluminum alloy clad materials were subjected to the following tests 1 to 5, whereby their properties were evaluated. The results are given in Table 2.

Test 1: Tensile Test

Each aluminum alloy clad material obtained was cut into a piece of 100 mm wide×250 mm long, and fluoride flux was applied in an amount of about 5 g/m² to both side surfaces of the obtained cut piece, and the resulting cut piece was dried, and was then subjected to heating for brazing by heating it at an average temperature-rising rate of 50° C./min to 600° C. (the maximum temperature) in a nitrogen gas atmosphere.

The cut piece after the heating for brazing was processed into a No. 5 test piece according to JIS Z 2201, and this test piece was then subjected to a tensile test at room temperature according to JIS Z 2241. The clad material was rated as excellent (○) if the tensile strength was 110 MPa or more and rated as poor (×) if it was less than 110 MPa.

Test 2: Inverted-T Test

As illustrated in FIG. 3, each aluminum alloy clad material obtained was cut into a cut piece 1 of 25 mm wide×60 mm long, and the surface of this obtained cut piece 1 on the cladding material side was used as a test surface of a horizontal plate, and a 3003 alloy plate 2 of 25 mm wide×55 mm long (1.0 mm thick, O material) was used as a vertical plate. With this 3003 alloy plate 2 being placed vertically on the horizontally placed cut piece 1, these two were brazed to be joined by heating for brazing at an average temperature-rising rate of 50° C./min to 600° C. (the maximum temperature) in a nitrogen gas atmosphere, whereby a joined product was obtained.

A position joined with the 3003 alloy plate 2 in a central portion of the horizontal plate (cut piece 1) forming the joined product in the longitudinal direction thereof (indicated by the reference sign "r" in FIG. 3) was embedded in a resin, and then the joined product was cut vertically to form the cross-section indicated by the shaded area in the figure. Whether a clearance was present in the joint between the horizontal plate and the vertical plate in the cross-section was observed. The clad material was rated as excellent (○) if a clearance was not present, and was rated poor (×) if a clearance was present.

Test 3: Fluidity Test

Each obtained aluminum alloy clad material was cut into a piece of 25 mm wide×100 mm long, one hole (φ6) for suspension was formed in the obtained cut piece, and then the weight (W0) was measured.

This cut piece was then suspended in a nitrogen gas furnace, the temperature therein was raised at an average temperature-rising rate of 50° C./min from room temperature to 600° C. to heat it to the maximum temperature of 600° C., and further it is held at 600° C. for 3 minutes. After the heating test, a brazing-material accumulating portion in a lower portion of the cut piece (B . . . a portion corresponding to the lower ¼ part of the cut piece in the longitudinal direction) was cut, and its weight (WB) was measured, and the fluid coefficient K was obtained by Formula: K=(4WB−W0)/(3W0×clad ratio).

The clad material was rated as having excellent fluidity (○) if the fluid coefficient K was 0.020 to 0.500, and was rated as having poor fluidity (×) if the fluid coefficient was less than 0.020 or more than 0.050.

Test 4: Cladding-Material Residual Ratio

From the above-described fluid coefficient K, the cladding-material residual ratio was calculated by Formula below:

$$\text{Cladding-material residual ratio (wt \%)} = (1 - K) \times 100$$

The clad material was rated as excellent residual capability (○) if the cladding-material residual ratio is 50 to 98 wt %, and was rated as poor residual capability (×) if the cladding-material residual ratio is less than 50 wt % or more than 98 wt %.

Test 5: Corrosion Test

Each aluminum alloy clad material obtained was cut into a piece of 100 mm wide×250 mm long, and fluoride flux was applied in an amount of about 5 g/m² to both side surfaces of the obtained cut piece, and the resulting cut piece was dried, and was then subjected to heating for brazing by heating it at an average temperature-rising rate of 50° C./min to 600° C. (the maximum temperature) in a nitrogen gas atmosphere.

A test piece of 50 mm wide×60 mm long was cut from the above-described cut piece after the heating for brazing and was used as a test piece, and its weight was measured. The surface of the test piece was then degreased with acetone, a surface of 40 mm wide×50 mm long was left exposed on the cladding material surface, and the rest (including the edges and back) was masked. After drying at room temperature for 1 day, a SWAAT test (ASTM-G85-A3) was performed for 6 weeks to evaluate corrosion resistance, and then acid washing was performed to remove corrosion products, and the amount of weight loss in 1 $cm^2$ ($g/cm^2$) was determined.

The corrosion form was observed from the surface of the cladding material and was determined as "uniform corrosion" if the cladding material was uniformly corroded, and determined "local corrosion" if localized pitting corrosion was apparently observed. The clad material was rated as having excellent corrosion resistance (○) if the amount of weight loss was less than 16 $mg/cm^2$ and the corrosion form was "uniform corrosion", rated as having poor corrosion resistance (×) if the amount of weight loss was less than 16 $mg/cm^2$ and the corrosion form was "local corrosion", and rated as having poor corrosion resistance (××) if the amount of weight loss was 16 $mg/cm^2$ or more.

residual capability in which the cladding-material residual ratios were 50 to 98 wt %. In the SWAAT test, perforation occurred after the test period of 6 weeks, and the amounts of weight losses were less than 16 $mg/cm^2$. Thus, it was found that all of them were excellent in brazability and corrosion resistance.

Comparison Examples

Instead of the combinations of the core-material ingots and the cladding-material ingots having the chemical compositions given in Table 1, combinations of core-material ingots and cladding-material ingots having the chemical compositions given in Table 3 were used to obtain two-layered laminates in each of which the cladding-material ingot was stacked on one side surface of the core-material ingot. Other than this, the same processes as in Examples were performed to produce comparative aluminum alloy

TABLE 1

| Clad material | Content of each constituent component in cladding material (mass %) | | | | | | | | | Content of each constituent component in core material (mass %) | | | | | | Total content of Mn and Fe in cladding material (mass %) |
|---|---|---|---|---|---|---|---|---|---|---|---|---|---|---|---|---|
| | Si | Zn | Mn | Fe | Sr | Cr | Zr | In | Sn | Cu | Mn | Cr | Ti | Zr | Mg | |
| 1 | 3.88 | 4.07 | 0.78 | 0.53 | 0.00 | 0.00 | 0.00 | 0.000 | 0.001 | 0.10 | 1.21 | 0.00 | 0.15 | 0.00 | 0.00 | 1.31 |
| 2 | 4.15 | 3.86 | 0.78 | 0.50 | 0.05 | 0.00 | 0.00 | 0.000 | 0.001 | 0.10 | 1.21 | 0.00 | 0.15 | 0.00 | 0.00 | 1.29 |
| 3 | 4.08 | 4.13 | 0.76 | 0.51 | 0.00 | 0.20 | 0.00 | 0.000 | 0.001 | 0.11 | 1.21 | 0.17 | 0.15 | 0.00 | 0.00 | 1.28 |
| 4 | 3.93 | 3.74 | 0.75 | 0.48 | 0.00 | 0.00 | 0.25 | 0.000 | 0.003 | 0.11 | 1.22 | 0.00 | 0.29 | 0.00 | 0.00 | 1.23 |
| 5 | 4.05 | 3.84 | 0.78 | 0.50 | 0.00 | 0.00 | 0.00 | 0.100 | 0.001 | 0.10 | 1.14 | 0.00 | 0.14 | 0.21 | 0.00 | 1.28 |
| 6 | 4.08 | 3.83 | 0.77 | 0.49 | 0.00 | 0.00 | 0.00 | 0.000 | 0.097 | 0.11 | 1.23 | 0.00 | 0.15 | 0.02 | 0.31 | 1.29 |
| 7 | 3.96 | 1.00 | 0.80 | 0.52 | 0.00 | 0.00 | 0.00 | 0.000 | 0.001 | 0.10 | 1.21 | 0.00 | 0.15 | 0.00 | 0.00 | 1.32 |

TABLE 2

| Clad material | Casting Possibility | Production Possibility | Tensile test Rating | Inverted-T test Rating | Fluidity coefficient K | Cladding material Residual ratio | Corrosion Test | | Overall rating |
|---|---|---|---|---|---|---|---|---|---|
| | | | | | | | Amount of weight loss ($g/cm^2$) | Corrosion form | |
| 1 | Possible | Possible | ○ | ○ | 0.044 | 96 wt % | 15.59 | Uniform corrosion | ○ |
| 2 | Possible | Possible | ○ | ○ | 0.050 | 95 wt % | 15.07 | Uniform corrosion | ○ |
| 3 | Possible | Possible | ○ | ○ | 0.041 | 96 wt % | 15.06 | Uniform corrosion | ○ |
| 4 | Possible | Possible | ○ | ○ | 0.085 | 92 wt % | 15.76 | Uniform corrosion | ○ |
| 5 | Possible | Possible | ○ | ○ | 0.044 | 96 wt % | 15.87 | Uniform corrosion | ○ |
| 6 | Possible | Possible | ○ | ○ | 0.056 | 94 wt % | 14.38 | Uniform corrosion | ○ |
| 7 | Possible | Possible | ○ | ○ | 0.047 | 95 wt % | 11.49 | Uniform corrosion | ○ |

As given in Table 2, all of the aluminum alloy clad materials (O-materials) 1 to 7 according to the present invention had tensile strengths after brazing that exceed 110 MPa, were excellent in joint condition in the inverted-T test, excellent in fluidity in which the fluid coefficients of the cladding materials were 0.040 or more, and also excellent in clad materials (O-materials) 11 to 26 having a two-layer structure with a thickness of 0.4 mm. Brazability and corrosion resistance were evaluated with the obtained comparative aluminum alloy clad materials 11 to 26 by conducting the tests 1 to 5 in the same manner as in Examples. The test results are given in Table 4.

TABLE 3

| Clad material | Content of each constituent component in cladding material (mass %) | | | | | | | | | Content of each constituent component in core material (mass %) | | | | | | Total content of Mn and Fe in cladding material (mass %) |
|---|---|---|---|---|---|---|---|---|---|---|---|---|---|---|---|---|
| | Si | Zn | Mn | Fe | Sr | Cr | Zr | In | Sn | Cu | Mn | Cr | Ti | Zr | Mg | |
| 11 | 11.39 | 4.13 | 0.77 | 0.49 | 0.00 | 0.00 | 0.01 | 0.000 | 0.001 | 0.10 | 1.21 | 0.00 | 0.15 | 0.00 | 0.00 | 1.26 |
| 12 | 1.97 | 3.89 | 0.81 | 0.52 | 0.00 | 0.00 | 0.00 | 0.000 | 0.001 | 0.10 | 1.21 | 0.00 | 0.15 | 0.00 | 0.00 | 1.32 |
| 13 | 4.11 | 5.77 | 0.80 | 0.52 | 0.00 | 0.00 | 0.00 | 0.000 | 0.001 | 0.10 | 1.21 | 0.00 | 0.15 | 0.00 | 0.00 | 1.32 |
| 14 | 4.08 | 3.93 | 1.05 | 1.10 | 0.00 | 0.00 | 0.00 | 0.000 | 0.001 | 0.10 | 1.21 | 0.00 | 0.15 | 0.00 | 0.00 | 2.15 |
| 15 | 4.32 | 3.96 | 0.79 | 0.51 | 0.06 | 0.00 | 0.00 | 0.000 | 0.001 | 0.10 | 1.21 | 0.00 | 0.15 | 0.00 | 0.00 | 1.30 |
| 16 | 4.10 | 3.98 | 0.80 | 0.51 | 0.00 | 0.37 | 0.00 | 0.000 | 0.001 | 0.10 | 1.21 | 0.00 | 0.15 | 0.00 | 0.00 | 1.31 |
| 17 | 3.90 | 3.74 | 0.73 | 0.47 | 0.00 | 0.00 | 0.40 | 0.000 | 0.005 | 0.10 | 1.21 | 0.00 | 0.15 | 0.00 | 0.00 | 1.20 |
| 18 | 4.13 | 3.91 | 0.80 | 0.50 | 0.00 | 0.00 | 0.00 | 0.139 | 0.001 | 0.10 | 1.21 | 0.00 | 0.15 | 0.00 | 0.00 | 1.30 |
| 19 | 4.02 | 3.86 | 0.76 | 0.49 | 0.00 | 0.00 | 0.00 | 0.000 | 0.150 | 0.10 | 1.21 | 0.00 | 0.15 | 0.00 | 0.00 | 1.25 |
| 20 | 3.88 | 4.07 | 0.78 | 0.53 | 0.00 | 0.00 | 0.00 | 0.000 | 0.001 | 0.20 | 1.19 | 0.00 | 0.15 | 0.00 | 0.01 | 1.31 |
| 21 | 3.88 | 4.07 | 0.78 | 0.53 | 0.00 | 0.00 | 0.00 | 0.000 | 0.001 | 0.11 | 2.03 | 0.00 | 0.14 | 0.00 | 0.01 | 1.31 |
| 22 | 3.88 | 4.07 | 0.78 | 0.53 | 0.00 | 0.00 | 0.00 | 0.000 | 0.001 | 0.11 | 1.23 | 0.36 | 0.15 | 0.00 | 0.00 | 1.31 |
| 23 | 3.88 | 4.07 | 0.78 | 0.53 | 0.00 | 0.00 | 0.00 | 0.000 | 0.001 | 0.11 | 1.21 | 0.00 | 0.34 | 0.00 | 0.01 | 1.31 |
| 24 | 3.88 | 4.07 | 0.78 | 0.53 | 0.00 | 0.00 | 0.00 | 0.000 | 0.001 | 0.10 | 1.08 | 0.00 | 0.14 | 0.40 | 0.00 | 1.31 |
| 25 | 3.88 | 4.07 | 0.78 | 0.53 | 0.00 | 0.00 | 0.00 | 0.000 | 0.001 | 0.11 | 1.25 | 0.00 | 0.15 | 0.00 | 0.60 | 1.31 |
| 26 | 3.95 | 4.18 | 1.72 | 0.07 | 0.00 | 0.00 | 0.00 | 0.000 | 0.001 | 0.10 | 1.21 | 0.00 | 0.15 | 0.00 | 0.00 | 1.79 |

TABLE 4

| Clad material | Casting Possibility | Production Possibility | Tensile test Rating | Inverted-T test Rating | Fluidity coefficient K | Cladding material Residual ratio | Corrosion Test | | Overall rating |
|---|---|---|---|---|---|---|---|---|---|
| | | | | | | | Amount of weight loss (g/cm$^2$) | Corrosion form | |
| 11 | Possible | Possible | x | ○ | 0.704 | 30 wt % | 14.84 | Local corrosion | x |
| 12 | Possible | Possible | ○ | x | 0.039 | 96 wt % | 10.39 | Uniform corrosion | ○ |
| 13 | Possible | Possible | ○ | ○ | 0.050 | 95 wt % | 17.73 | Local corrosion | xx |
| 14 | Possible | Possible | ○ | ○ | 0.023 | 98 wt % | 18.52 | Local corrosion | xx |
| 15 | Possible | Possible | ○ | ○ | 0.034 | 97 wt % | 16.30 | Uniform corrosion | x |
| 16 | Impossible | Impossible | — | — | — | — | — | — | — |
| 17 | Impossible | Impossible | — | — | — | — | — | — | — |
| 18 | Possible | Possible | ○ | ○ | 0.026 | 97 wt % | 14.66 | Local corrosion | x |
| 19 | Possible | Possible | ○ | x | 0.036 | 96 wt % | 17.83 | Uniform corrosion | x |
| 20 | Possible | Possible | ○ | ○ | 0.031 | 97 wt % | 16.04 | Local corrosion | x |
| 21 | Possible | Impossible | — | — | — | — | — | — | — |
| 22 | Impossible | Impossible | — | — | — | — | — | — | — |
| 23 | Impossible | Impossible | — | — | — | — | — | — | — |
| 24 | Impossible | Impossible | — | — | — | — | — | — | — |
| 25 | Possible | Possible | ○ | ○ | 0.029 | 97 wt % | 16.14 | Local corrosion | xx |
| 26 | Possible | Possible | ○ | ○ | 0.047 | 95 wt % | 15.19 | Local corrosion | x |

As given in Table 4, in the comparative aluminum alloy clad material 11, the Si concentration in the cladding material was high, which caused the brazing material to flow and the plate thickness to decrease, and the tensile strength after brazing in Test 1 was less than 110 MPa. Furthermore, the cladding-material residual ratio in Test 4 was low to be less than 50 wt % (be 30 wt %), and in the corrosion test of Test 5, local corrosion occurred in which localized pitting corrosion was apparently observed.

As given in Table 4, in the comparative aluminum alloy clad material 12, the Si content in the cladding material is low, which did not provide a sufficient liquid phase, and the fluidity of the brazing material decreased, resulting in a clearance in the inverted-T test (resulting incomplete joint).

As given in Table 4, in the comparative aluminum alloy clad material 13, the Zn concentration in the cladding material was high, which caused the cladding material to corrode early, so that the corrosion resistance in the corrosion test of Test 5 was low.

As given in Table 4, in the comparative aluminum alloy clad material 14, the total content of Fe and Mn in the cladding material was 2.2 mass %, which caused many compounds such as Al—Fe—Si-based, Al—Fe—Mn-based, and Al—Fe—Mn—Si-based compounds to be formed and the fluidity of the brazing material to decrease, and the corrosion resistance in the corrosion test of Test 5 was low.

As given in Table 4, in the comparative aluminum alloy clad material 15, the Sr concentration in the cladding material was high, which caused an Al—Si—Sr compound to be formed and the fluidity of the brazing material to decrease, and also in the corrosion test in Test 5, the amount of weight loss was 16.30 g/cm$^2$ and the corrosion resistance was low.

As given in Table 4, during the production of the comparative aluminum alloy clad materials 16 and 17, casting was stopped because the contents of Cr and Zr in the cladding material were high and coarse crystallized substances were formed during the casting of the cladding material.

As given in Table 4, in the comparative aluminum alloy clad material 18, the In concentration in the cladding material was high, and the fluidity of the brazing material was accordingly low.

As given in Table 4, in the comparative aluminum alloy clad material 19, the Sn concentration in the cladding material was high and the fluidity of the brazing material was accordingly low, and the Sn that evaporated from the cladding material during heating for brazing inhibited the wettability of the joint surface, resulting in a clearance in the inverted-T test. Thus, a sound joint could not be obtained.

As given in Table 4, in the comparative aluminum alloy clad material 20, the Cu concentration in the core material was high and the fluidity of the brazing material was accordingly low, and the Cu diffused from the core material to the cladding material reduced the sacrificial anode effect of the cladding material, resulting in low corrosion resistance in the corrosion test in Test 5.

As given in Table 4, during the production of the comparative aluminum alloy clad material 21, it was impossible to produce the clad material due to severe edge cracking during rolling.

As given in Table 4, during the production of the comparative aluminum alloy clad materials 22, 23, and 24, casting was stopped because the contents of Cr, Ti, and Zr in the core material were high and coarse crystallized substances were formed during casting of the core material.

As given in Table 4, in the comparative aluminum alloy clad material 25, the Mg content in the core material was high, and MgO, which was formed by bonding between Mg diffused from the core material and oxygen in the furnace and inhibited brazability, was formed on the brazing-material surface layer, resulting in insufficient fluidity of the brazing material. Furthermore, the Mg concentration diffused from the core material to the cladding material was high, which increased micro-precipitation serving as a starting point of a cathode in the cladding material, and the corrosion resistance was low in the corrosion test of Test 5.

As given in Table 4, in the comparative aluminum alloy clad material 26, which did not comprise Fe in the cladding material, local corrosion occurred and localized pitting corrosion was apparently observed in the corrosion test of Test 5, resulting in low corrosion resistance.

The invention claimed is:

1. An aluminum alloy clad material for a heat exchanger comprising a cladding material on one side surface or both side surfaces of a core material, wherein
    the core material comprises: Mn at 0.50 to 1.80 mass %; Cu at more than 0.05 mass % and less than 0.20 mass % and Ti at 0.05 to 0.30 mass % with the balance being Al and inevitable impurities, and
    the cladding material comprises: Si at 3.00 to 7.00 mass %; Fe at 0.30 to 0.80 mass %; Mn at 0.30 to 1.80 mass %; and Zn at 1.00 to 5.00 mass % with the balance being Al and inevitable impurities, in which the total content of the Fe and the Mn is 2.10 mass % or less,
    wherein a cladding-material residual ratio is 50 to 98 wt % in a heating test in which a temperature is raised at an average temperature-rising rate of 50° C./min from room temperature to 600° C. and kept at 600° C. for 3 minutes, and
    wherein the thickness of the aluminum alloy clad material is 0.15 to 0.50 mm.

2. The aluminum alloy clad material for a heat exchanger according to claim 1, wherein the core material further comprises one or more types selected from Cr at 0.300 mass % or less (including zero) and Zr at 0.300 mass % or less (including zero).

3. The aluminum alloy clad material for a heat exchanger according to claim 1, wherein the core material further comprises Mg at 0.500 mass % or less (including zero).

4. The aluminum alloy clad material for a heat exchanger according to claim 1, wherein the core material further comprises one or more types selected from Si at 0.8 mass % or less (including zero) and Fe at 0.7 mass % or less (including zero).

5. The aluminum alloy clad material for a heat exchanger according to claim 1, wherein the cladding material further comprises Mg at 0.500 mass % or less (including zero).

6. The aluminum alloy clad material for a heat exchanger according to claim 1, wherein the cladding material further comprises Sr at 0.050 mass % or less (including zero).

7. The aluminum alloy clad material for a heat exchanger according to claim 1, wherein the cladding material further comprises one or more types selected from Cr at 0.300 mass % or less (including zero) and Zr at 0.300 mass % or less (including zero).

8. The aluminum alloy clad material for a heat exchanger according to claim 1, wherein the cladding material further comprises one or more types selected from In at 0.100 mass % or less (including zero) and Sn at 0.100 mass % or less (including zero).

* * * * *